(12) United States Patent
Russo

(10) Patent No.: US 8,069,775 B2
(45) Date of Patent: Dec. 6, 2011

(54) BREWING APPARATUS AND PROCESS FOR MAKING INFUSIONS OR BEVERAGES, PARTICULARLY ESPRESSO

(75) Inventor: Pietro Russo, Calenzano (IT)

(73) Assignee: Plast 2000 S.R.L., Calenzano (FI) (IT)

( * ) Notice: Subject to any disclaimer, the term of this patent is extended or adjusted under 35 U.S.C. 154(b) by 511 days.

(21) Appl. No.: 12/307,476

(22) PCT Filed: Jul. 2, 2007

(86) PCT No.: PCT/EP2007/005828
§ 371 (c)(1),
(2), (4) Date: Jan. 5, 2009

(87) PCT Pub. No.: WO2008/003441
PCT Pub. Date: Jan. 10, 2008

(65) Prior Publication Data
US 2009/0205505 A1    Aug. 20, 2009

(30) Foreign Application Priority Data

Jul. 7, 2006  (IT) .............................. PR2006A0063
May 16, 2007 (IT) .............................. PR2007A0035

(51) Int. Cl.
*A47J 31/36* (2006.01)
(52) U.S. Cl. .......................................... 99/303; 99/295
(58) Field of Classification Search ................ 99/295, 99/303, 302 R
See application file for complete search history.

(56) References Cited

U.S. PATENT DOCUMENTS
5,186,096 A    2/1993    Willi

FOREIGN PATENT DOCUMENTS
| DE | 93 09 438 | 9/1993 |
| EP | 0 427 666 | 5/1991 |
| EP | 0 934 719 | 8/1999 |
| EP | 1 490 353 | 9/2004 |

OTHER PUBLICATIONS

International Search Report date Sep. 20, 2007, from corresponding PCT application.

*Primary Examiner* — Reginald L Alexander
(74) *Attorney, Agent, or Firm* — Young & Thompson

(57) ABSTRACT

A brewing apparatus (1,101) for making infusions, particularly espresso, including a pumping unit (2,102) for pumping water from a tank (3,103) to a water superheating boiler (6,106), wherein the boiler (6,106) has a lower container (11,111) closed at its top by a perforated cover (12,112) allowing superheated water to flow into the lower container under pressure, the lower container (11,111) and top cover (12,112) being a plastic material. The brewing process includes a first step in which water is fed and pumped at a first feed velocity, a second step in which the velocity is increased to increase pressure in the chamber; the first velocity being lower than the second velocity. The upper boiler body (112) has the closing face (112*a*) of such a shape as to receive a corresponding single-dose pod (100) packed in paper, aluminum or another biodegradable material containing coffee or another flavor base in general.

18 Claims, 4 Drawing Sheets

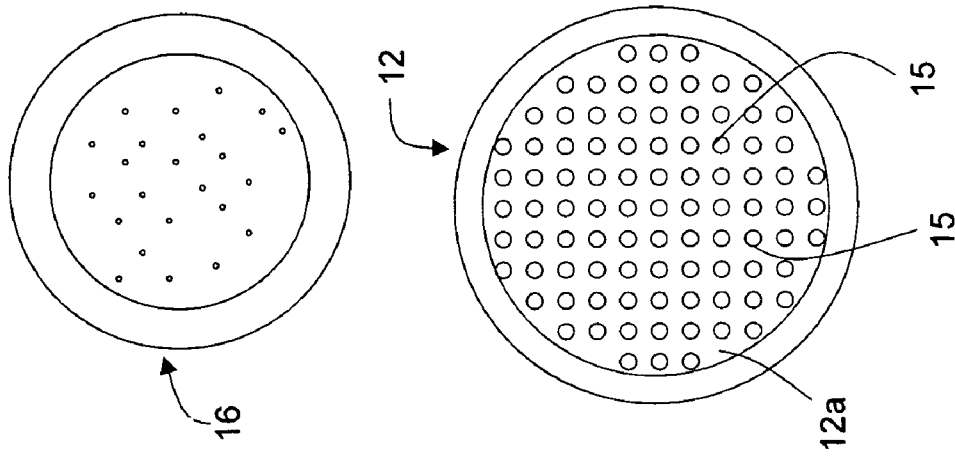
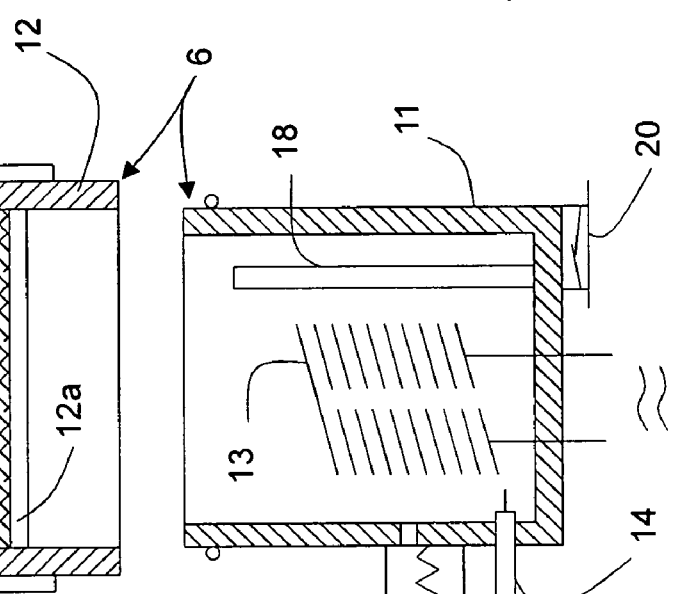
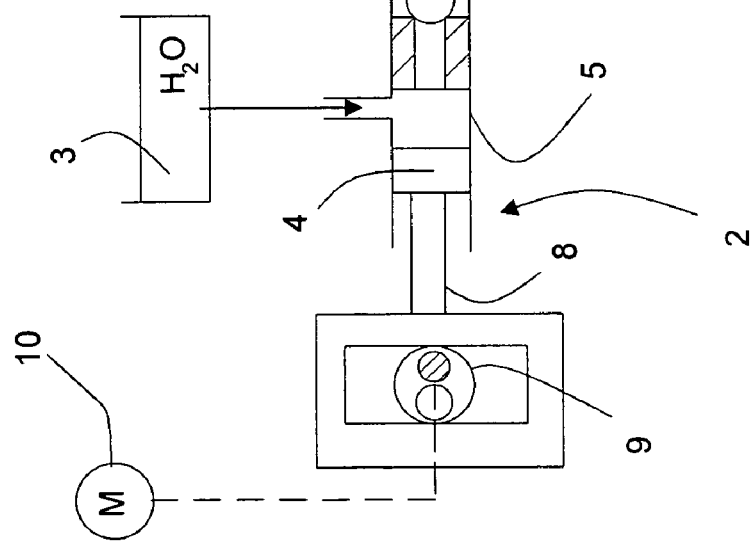
FIG. 1
FIG. 2
FIG. 3

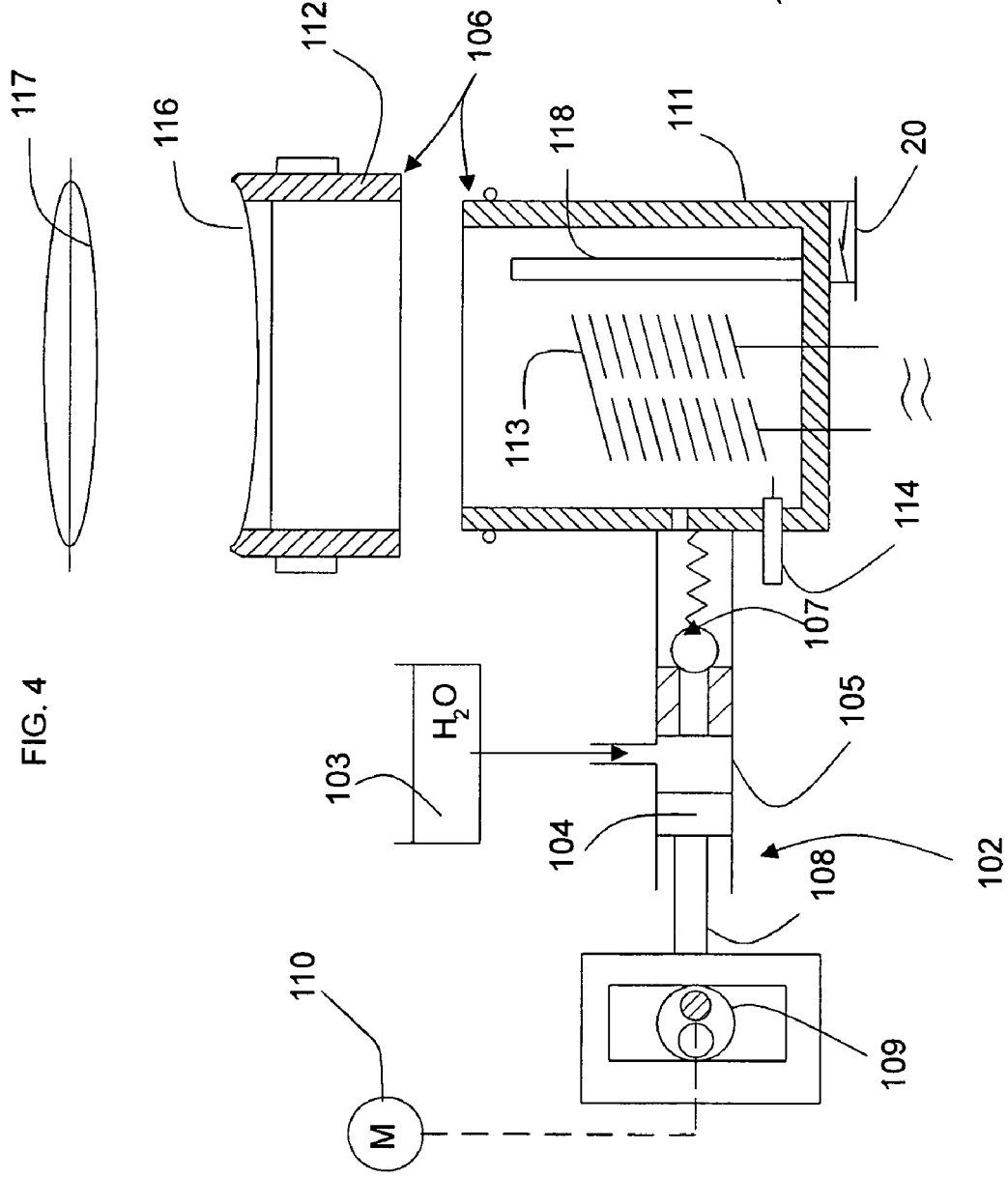

BREWING APPARATUS AND PROCESS FOR MAKING INFUSIONS OR BEVERAGES, PARTICULARLY ESPRESSO

The present invention relates to a brewing apparatus for making infusions or beverages, particularly espresso, by causing superheated water to flow under pressure through a dose of flavor base (ground coffee, tea, etc.).

Prior art apparatus use a pump to draw water from a tank and feed it under pressure through a previously electrically heated heating element, and into the dose of ground coffee, to cause the desired infusion to flow therefrom.

The apparatus employed heretofore have the following drawbacks:
  High power consumption, brewing apparatus of this type requiring a power of 900 Watts on average;
  Long times to reach the working temperature;
  Heavy weight of the brewing apparatus, which is formed of metal parts;
  Decreased efficiency of the system, due to the limestone deposits that build up on the metal parts with time.

The present invention has the object of obviating the above drawbacks, by providing a brewing apparatus as defined in the annexed claims.

The advantages provided thereby may be summarized as follows:
  low power consumption; 120 Watt are sufficient to achieve the same waiting times as prior art machines,
  quick attainment of the ideal temperature,
  lighter weight, the boiler and pump unit being wholly made of plastic,
  lower industrialization costs,
  no maintenance, thanks to the lack of limestone deposits,
  high hygienic quality of the apparatus.

Another object of the present invention is to provide a brewing apparatus, according to the above mentioned characteristics, particularly designed and conformed for performance improvement with single-dose pods packaged in paper, aluminum or any other biodegradable material.

The first advantage derived therefrom is improved sealing of the pod by the dispensing unit on the pod supporting boiler body, and hence a more convenient infusion dispensing system; finally, advantages include a convenient pod ejecting arrangement, as better described below.

These objects and advantages are achieved by the brewing apparatus and process for making infusions and particularly espresso according to this invention, which is characterized as defined in the annexed claims.

Figure 6:
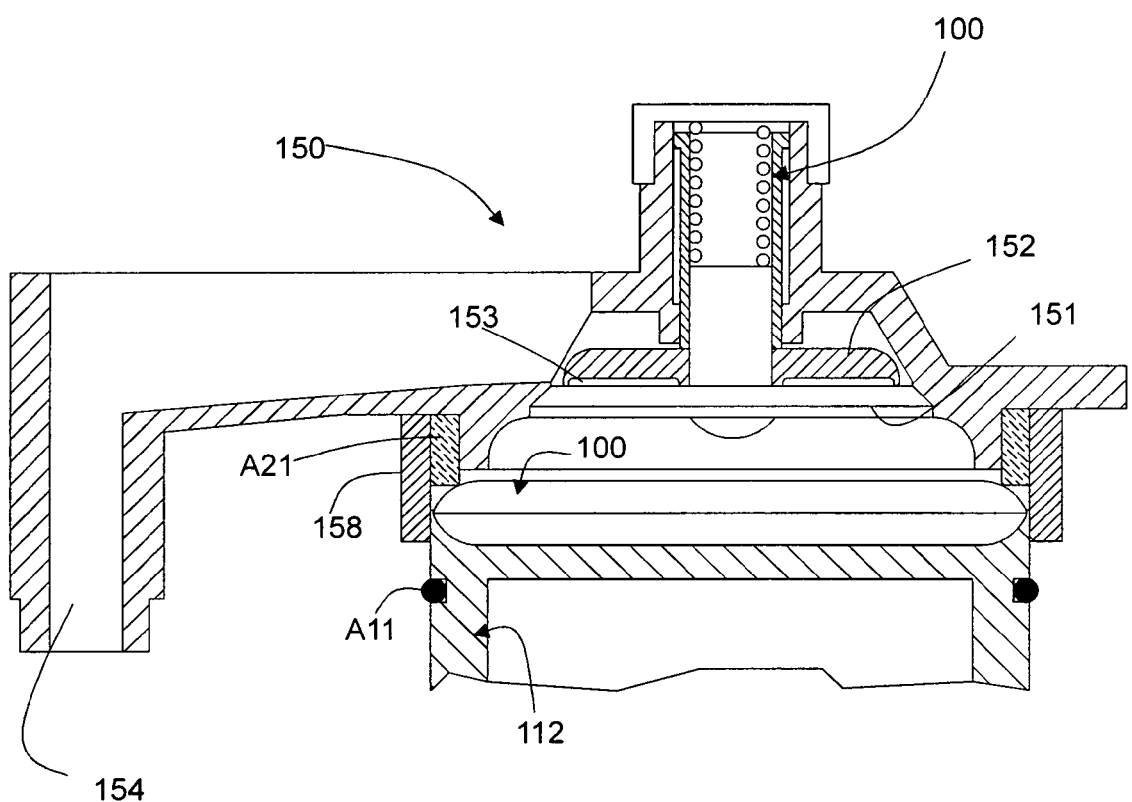
Figure 6A:
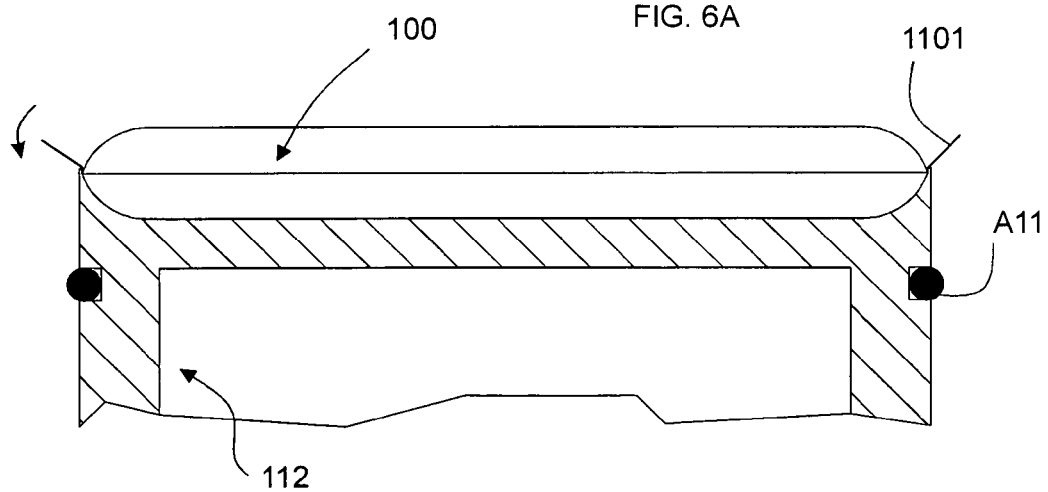
Figure 7:
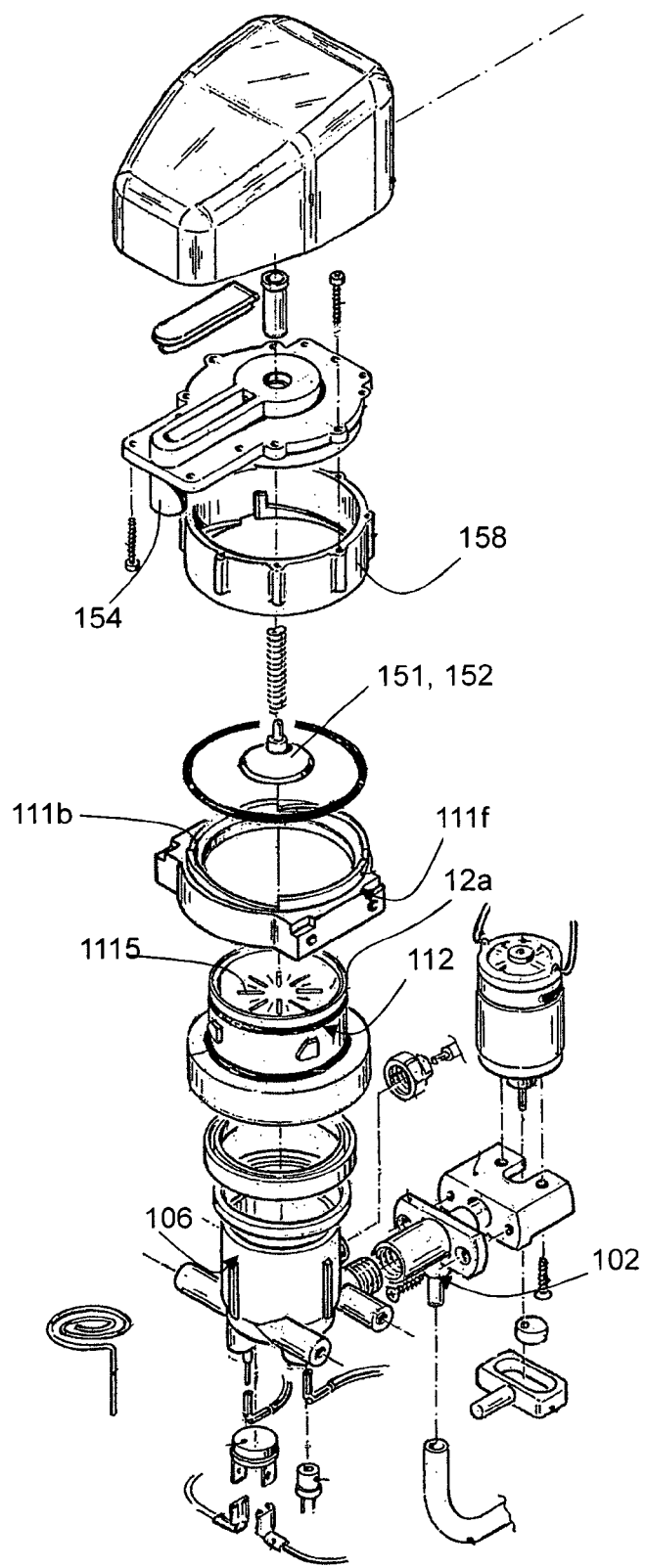

These and other features will be more apparent from the following description of a few embodiments, which are shown by way of example and without limitation in the accompanying drawings, in which:

FIG. 1 shows a schematic exploded view of a brewing apparatus of the invention, particularly for brewing espresso, FIG. 2 is a bottom view of the closing cover of the boiler of the apparatus, FIG. 3 is a top view of a usable filter seal, FIG. 4 is another exemplifying schematic view of the brewing apparatus of the invention, with upper boiler body (112) having the closing face (112a) of such a shape as to receive a corresponding single-dose pod (100) packed in paper, aluminum or another biodegradable material, FIG. 5 shows a bottom view of the upper boiler body of FIG. 4, FIG. 6 shows a detail of the dispensing unit of the present apparatus of FIG. 4, FIG. 6A shows the upper boiler body of FIG. 4 with the pod received therein, FIG. 7 shows an exploded view of the boiler-dispensing unit system of FIG. 4.

Referring to FIG. 1, numeral 1 generally designates a brewing apparatus, particularly for making espresso, which is shown in a schematic exploded view.

The apparatus 1 comprises a pumping unit 2 of plastic material, in this example composed of a reciprocating piston 4 operating on a chamber 5 to feed water from a special tank 3 into a generally cylindrical boiler 6; a check valve 7 prevents any backflow of the water so pumped.

The piston 4 of the pumping unit 2 is driven by a crank mechanism of the slider 8—crank 9 type, in this example an eccentric cylinder rotated by a motor 10, which is preferably in direct connection therewith, although cascaded gears or equivalent motion transmission systems may be also provided.

The boiler 6 is comprised of a lower container 11 of plastic material, which is closed at its top by a perforated cover 12, also of plastic material, for the superheated and pressurized water in the lower container 11 to flow therethrough.

A heating element 13, a temperature probe 14 and an overflow sensor 18 are located in said container 11.

The element 13 is substantially an electric resistor, which increases the temperature of water contained therein to a value of 90 to 95° C.

The temperature probe 14 directly measures the temperature attained by water in the boiler 6; as the optimal value is reached, it transmits a signal or turns off the resistor 13.

The overflow sensor 18 stops the pumping unit 2 when the boiler 6 is filled with water; as long as this does not occur, the heating element 13 cannot be operated.

A safety thermostat 20, e.g. of the bimetallic strip type, may be also provided on the outer surface of the boiler 6.

As mentioned above, the cover 12 has holes formed therein; particularly referring to FIG. 2, which shows a top view of the cover, the latter is illustrated as having a plurality of holes 15, formed on the face 12a that closes the boiler 6; the number and size of the holes 15 may change from a minimum of one hole, preferably in a central position, to any number compatible with the diameter of the cover 12.

Over the holes 15, a seal 16 having microholes therein allows the passage superheated water to wet the ground coffee dose, which is provided in the form of a capsule or cartridge of well-known type.

The seal 16 may be embedded in the cover 12, as shown, or may simply abut against the face 12a, depending on the construction of the infusion chamber, not shown, which may also be of plastic or rubbery material.

Also, the seal 16 may be so conformed as to obstruct one or more underlying holes, which are designed to be reopened by the overpressure created in the boiler 6.

The seal 16 has in turn microholes 15, as shown in the top view of FIG. 3, for the superheated and pressurized water to flow therethrough, to the dose of ground coffee, or another flavor base, to be used to prepare the infusion; the dose being located in an overlying brewing chamber that may be connected to the cover in various manners.

As described above, the water has a substantially vertical flow, the boiler 6, as well as the seal 16 and brewing chamber, having a cylindrical extension with a normal axis 6a.

The process of operation of the brewing apparatus 1 is now described, and includes the following steps:
  After start up, the pumping unit 2 is operated until the maximum level is reached in the boiler 6, as controlled by the sensor 18, Now, the sensor 18 stops the motor 10, and hence the pumping unit 2 and transmits a consent signal to turn on the heating element 13, which in turn increases the temperature of water in the boiler 6, which temperature is controlled by the thermostat 14, Once the ideal temperature value is reached, the probe 14 starts the brewing process, which includes two distinct steps:

A first step, in which water is pumped at a first velocity of the motor 10 and the pumping unit 2, A second higher velocity step for increasing pressure in the boiler 6; obviously, said first velocity being lower than said second velocity.

The motor 10 is powered either by electric accumulators (batteries of any type, i.e. lithium batteries, vehicle batteries, etc) or by the mains.

Obviously, the apparatus 1 shall be equipped with all the other seals adapted to prevent liquid leakages from the various connected parts.

While reference has been made herein to a particular embodiment, it shall be understood that the geometries, shapes and proportions of the components may be different from those described above, without departure from the inventive scope of the apparatus 1.

Referring to FIG. 4, numeral 101 generally designates a brewing apparatus, particularly for making espresso, which is shown in a schematic view and which is particularly suitable for single-dose pods 100 packaged in paper, aluminum or any other biodegradable material.

It must be observed the presence of a pumping unit 102 of plastic material, in this example composed of a reciprocating piston 104 operating on a chamber 105 to feed water from a special tank 103 into a boiler 106, here with a check valve 107 which prevents any backflow of the water so pumped.

Particularly, the boiler 106 is shown to be directly attached to the pumping unit 102: the piston 104 of the pumping unit 102 is driven by a crank mechanism of the slider 108—crank 109 type, in this example an eccentric cylinder rotated by a motor 110, which is preferably in direct connection therewith, although cascaded gears or equivalent motion transmission systems may be also provided.

The boiler 106 is comprised of a lower container 111 closed at its top by a cover or upper boiler body 112, both formed of plastic material.

Particularly referring to the bottom view of FIG. 5, the upper boiler body is shown to have one or more radial slots 1115, formed on the face 112*a* that closes the boiler 106; the superheated water contained in the lower container 111 will flow under pressure through these slots 1115.

As in the case of FIG. 1, a heating element 113, a temperature probe 114 and an overflow sensor 118 are located in said container 111.

The element 113 is substantially an electric resistor, which increases the temperature of water contained therein to a value preferably of 90 to 95° C.

The temperature probe 114 directly measures the temperature attained by water in the boiler 106; as the optimal value is reached, it transmits a signal or turns off the resistor 113.

The overflow sensor 118 stops the pumping unit 102 when the boiler 106 is filled with water; as long as this does not occur, the heating element 113 cannot be operated.

A safety thermostat 120, e.g. of the bimetallic strip type, may be also provided on the outer surface of the boiler 106.

Particularly referring to FIG. 6, there is shown the particular design of the upper boiler body 112, that can directly support the pod 100, because its shape is complementary to the shape of half a pod 100.

The pod 100 lies on the upper boiler body 112, wherefore the superheated water from the underlying boiler 106 flows directly therethrough.

Particularly referring to FIGS. 6 and 6A, the sealing action is shown to be ensured by the dispensing unit 150 as it closes against the flange 111 of the boiler body 112: since the pods 100 have a rim 1101 that protrudes out of the boiler body 112, such rim 1101 is folded upon closure of the dispensing unit 150, thereby stabilizing the pod 100 and further enhancing the sealing effect.

Such sealing effect is further ensured by a dual sealing arrangement, such as:

a first ring A11—such as an O-ring received in the corresponding annular recess of the upper boiler body 112, a second seal A21, which is fitted in the closing ring 158 and is designed to be compressed upon mounting thereof to the upper boiler body 112.

The above dispensing unit 150 has such a shape as to substantially mate with the corresponding pod 100 for receiving it.

To avoid pinching of the ring A11, the ring 158 of the dispensing unit 150 has to be mounted.

Still in FIG. 6A, the edge of the boiler body 112 is shown to be beyond the center line of the pod, to close against said second seal A21 as the dispensing unit 150 is pressed thereagainst.

As mentioned above, to ensure a clamping and sealing effect, the dispensing unit 150, and particularly the ring 158 is pressed against the flange 111*f* coaxial with the upper boiler body 112; said flange 111*f* having a number of cam-like portions 111*b* which will lock the ring 158 and the dispensing unit 150 as the latter is rotated with respect to it.

The above is shown in detail in FIG. 7, which shows the exploded configuration of the whole brewing apparatus 1.

Particularly there is shown:

the lower boiler body 111, the upper boiler body 112, having the particular conformation for receiving the pod 100, the coaxial flange 111*f* which will be attached to said body 112 thereby closing the ring 158 of the dispensing unit 150 upon rotation and operation of the cam-like portions 111*b*, the dispensing unit 150 which actually acts as a cap for the pod that lies directly on the upper boiler body 112, as well as a seal, said unit 150 being clamped against the flange, all the other components are better identified in the exploded figure which particularly shows the water tank, various sealing rings, a battery, a motor, the heating element, the thermostat and the pumping unit.

As described above, the water has a substantially vertical flow, the boiler 106, as well as the boiler body 112, the pod 100 and the dispensing unit 150, having a cylindrical extension with a normal axis 106*a*.

Particularly referring to FIG. 3, there is shown in detail the dispensing unit 150 and particularly the ring that closes against the flange 111*f*, the outline 150*a* partly corresponding to that of the pod 100 but adapted to be mounted to the upper boiler body 112 to fold the rims 1101 of the pod 100.

Once the dispensing unit 150 has been mounted to the pod 100, a disk 151 presses against the top surface of the latter: the disk 150 having suitable radial slots adapted to act as a filter for the infusion produced due to the passage of superheated water through the underlying pod 100.

A disk spring 152 defining an annular cavity 153 is mounted coaxially above said filter/disk 151 (considering the direction of observation of the drawing): under the pressure applied by the boiler 106, the brewed liquid lifts the edges of the disk spring 152 and flows out toward the outlet channel 154.

If the pod contains ground coffee, the disk spring 152 has the function to create a sort of coffee cream like that produced by an espresso machine.

Still in FIG. 6, there is shown a system for ejecting the used pod 100, said system being spring-operated to press against the disk spring 152, i.e. the filter 151 and separate said elements and hence the underlying pod 100.

The invention claimed is:

1. A brewing apparatus (1) for making infusions, particularly espresso, of the type comprising a pumping unit (2) for pumping water from a tank (3) to a water superheating boiler (6), said boiler (6) having a lower container (11) closed at its top by a perforated cover (12) allowing superheated water to flow into the lower container under pressure, said lower container (11) and top cover (12) being formed of a plastic material, said cover (12) having one of more holes (15) for the passage of superheated water on the face (12a) that closes the boiler (6), characterized in that over the holes (15) of the cover (12), a seal (16) for containing and/or separating a dose of ground coffee, has microholes therein for allowing the passage of superheated water to wet the ground coffee dose; said seal (16) being embedded in the cover (12), or abutting against the face (12a), depending on the construction of the brewing chamber; said seal (16) being of plastic or rubbery material.

2. A brewing apparatus (1) as claimed in claim 1, characterized in that the seal (16) is so conformed as to obstruct one or more underlying holes (15), which are designed to be reopened by the overpressure created in the boiler (6).

3. A brewing apparatus (1) as claimed in claim 1, characterized in that the coffee dose is in the form of capsules, pods or ground coffee.

4. A brewing apparatus (1) as claimed in claim 1, characterized in that said boiler (6)
   contains a water level sensor (18), or overflow sensor, to stop the pumping unit (2) when the boiler (6) is filled with water; as long as this does not occur, the heating element (13) cannot be operated and
   is directly attached to the pumping unit (2); said pumping unit being formed of a plastic material.

5. A brewing apparatus (1) as claimed in claim 1, characterized in that comprises a motor (10) powered either by electric accumulators (batteries of any type, i.e. lithium batteries, vehicle batteries, etc) or by the mains.

6. A brewing apparatus (1) as claimed in claim 1, characterized in that said pumping unit (2) operates at least at two velocities, said first velocity for wetting ground coffee, and said second velocity for increasing the pressure in the chamber; said first velocity being lower than said second velocity.

7. A brewing apparatus (101) for making infusions, particularly espresso, of the type comprising a pumping unit (102) for pumping water from a tank (103) to a water superheating boiler (106), said boiler (106) having a lower container (111) closed at its top by a perforated cover (112) allowing superheated water to flow into the lower container under pressure, said lower container (111) and top cover (112) being formed of a plastic material characterized in that the upper boiler body (112) has the closing face (112a) of such a shape as to receive a corresponding single-dose pod (100) packed in paper, aluminum or another biodegradable material and containing coffee or another flavor base in general; said pod (100) and said upper boiler body (112) being closed at their top by a liquid beverage dispensing unit (150); said pod (100) lies directly on the upper boiler body (112) and has the superheated water from the underlying boiler (106) flowing directly therethrough.

8. A brewing apparatus (101) as claimed in claim 7, characterized in that said dispensing unit (150) is also shaped complementarily to the pod (100) to receive the upper part thereof.

9. A brewing apparatus (101) as claimed in claim 7, characterized in that said dispensing unit (150) operates trough a ring (158) that closes against a flange (111f) coaxial with the upper boiler body (112); said flange (111f) having a number of cam-like portions (111b) which are designed to lock the dispensing unit (150) as the latter is rotated with respect to it.

10. A brewing apparatus (101) as claimed in claim 7, characterized in that, upon closure of the dispensing unit (150), the rim (1101) of the pod (100) is folded thereby stabilizing the pod (100) and ensuring a sealing effect.

11. A brewing apparatus (101) as claimed in claim 7, characterized in that it has:
   a. a first ring (A11) received in the corresponding annular recess of the upper boiler body (112)
   b. a second seal (A21), which is fitted in the closing ring (158) of the dispensing unit (150) and is designed to be compressed upon mounting thereof to the upper boiler body (112).

12. A brewing apparatus (101) as claimed in claim 7, characterized in that the edge (112a) of the upper boiler body (112) is beyond the center line of the pod (100), to close against the seal (A21) and said upper boiler body (112) has one of more radial slots (1115) for the passage of superheated water on the face (112a) that closes the boiler (106).

13. A brewing apparatus (101) as claimed in claim 7, characterized in that, once the dispensing unit (150) has been mounted to the pod (100), a disk (151) presses against the top surface of the latter: the disk (151) having suitable radial slots adapted to act as a filter for the infusion produced due to the passage of superheated water through the underlying pod (100).

14. A brewing apparatus (101) as claimed in claim 13, characterized in that a disk spring (152) defining an annular cavity (153) is mounted coaxially above said disk (151); under the pressure applied by the boiler (106), the brewed liquid lifts the edges of the disk spring (152) and flows out toward the outlet channel (154); so that a sort of cream is thus created, like that produced using an espresso machine.

15. A brewing apparatus (101) as claimed in claim 7, characterized in that said dispensing unit (150) comprises a system for ejecting the used pod (100), which is spring-operated to press against the disk spring (152), i.e. the filter (151) and separate said elements and hence the underlying pod (100).

16. A brewing apparatus (101) as claimed in claim 7, characterized in that said boiler (106)
   contains a water level sensor (118), or overflow sensor, to stop the pumping unit (102) when the boiler (106) is filled with water; as long as this does not occur, the heating element (113) cannot be operated and
   is directly attached to the pumping unit (102); said pumping unit being formed of a plastic material.

17. A brewing apparatus (101) as claimed in claim 7, characterized in that comprises a motor (110) powered either by electric accumulators (batteries of any type, i.e. lithium batteries, vehicle batteries, etc) or by the mains.

18. A brewing apparatus (101) as claimed in claim 7, characterized in that said pumping unit (102) operates at least at two velocities, said first velocity for wetting ground coffee, and said second velocity for increasing the pressure in the chamber; said first velocity being lower than said second velocity.

* * * * *